(12) United States Patent
Hancock (10) Patent No.: US 12,337,256 B2
(45) Date of Patent: Jun. 24, 2025

(54) TOY APPARATUS WHICH IS CONSTRUCTED TO TRAVEL FROM PLACE TO PLACE AND WHICH PROVIDES AN OPTICAL ILLUSION FOR A VIEWER

(71) Applicant: Philippa Claire Barbara Hancock, Beaconsfield (GB)

(72) Inventor: Philippa Claire Barbara Hancock, Beaconsfield (GB)

( * ) Notice: Subject to any disclaimer, the term of this patent is extended or adjusted under 35 U.S.C. 154(b) by 698 days.

(21) Appl. No.: 17/673,241

(22) Filed: Feb. 16, 2022

(65) Prior Publication Data

US 2022/0266162 A1    Aug. 25, 2022

(30) Foreign Application Priority Data

Feb. 19, 2021    (GB) .................................... 2102338

(51) Int. Cl.
| | |
|---|---|
| *A63H 7/02* | (2006.01) |
| *A63H 33/00* | (2006.01) |
| *G02B 27/06* | (2006.01) |
| *G03B 25/00* | (2006.01) |

(52) U.S. Cl.
CPC ............. *A63H 33/007* (2013.01); *A63H 7/02* (2013.01); *G02B 27/06* (2013.01)

(58) Field of Classification Search
CPC ........... A63H 7/02; G02B 27/06; G03B 25/00
See application file for complete search history.

(56) References Cited

U.S. PATENT DOCUMENTS

| | | | |
|---|---|---|---|
| 9,170,479 B1 * | 10/2015 | Kosakura | G03B 25/00 |
| 2003/0095235 A1 * | 5/2003 | Tsai | G03B 25/00 |
| | | | 352/99 |

FOREIGN PATENT DOCUMENTS

GB            2511117 A  *  8/2014  ........... A63H 33/007

* cited by examiner

*Primary Examiner* — Ryan D Howard
(74) *Attorney, Agent, or Firm* — Michael D. Eisenberg (57) ABSTRACT

Toy apparatus (1) which is constructed to travel from place to place and which provides an optical illusion for a viewer, and wherein the toy apparatus (1) comprises:
i) a device (17) having a plurality of separate images (18);
ii) the separate images (18) are displayed on panels (19);
iii) the panels (19) are rotatable;
iv) the panels (19) are such that when they are rotating and when the separate images (18) are viewed by the viewer, they provide an optical illusion due to the viewer's persistence of vision; and
v) the toy apparatus (1) is movable from place to place.

19 Claims, 10 Drawing Sheets

TOY APPARATUS WHICH IS CONSTRUCTED TO TRAVEL FROM PLACE TO PLACE AND WHICH PROVIDES AN OPTICAL ILLUSION FOR A VIEWER

CROSS-REFERENCES TO RELATED APPLICATIONS

The present application claims priority from GB Patent Application No. 2102338.7, filed on Feb. 19, 2021, which is hereby incorporated herein by reference in their entirety.

TECHNICAL FIELD

This invention relates to toy apparatus and, more especially, this invention relates to toy apparatus which is constructed to travel from place to place and which provides an optical illusion for a viewer. The toy apparatus provides the optical illusion by relying on the phenomenon known as persistence of vision. The viewer will typically be a young child, but the viewer may be an older person if desired.

BACKGROUND

There are many known types of toy apparatus for providing an optical illusion for a viewer, with the toy apparatus relying on the viewer's persistence of vision. Well known examples of such toy apparatus are zoetropes, thaumatropes and flip/flicker books. Such types of toy apparatus have been known for over one hundred years. Modern versions of such toy apparatus are disclosed in my Patent Nos. GB2493168 and GB2511117 and in my International Patent Publication No. WO 2019/122796 A1.

BRIEF SUMMARY OF THE INVENTION

It is an aim of the present invention to provide an alternative to the known toy apparatus.

Accordingly, in one non-limiting embodiment of the present invention there is provided toy apparatus which is constructed to travel from place to place and which provides an optical illusion for a viewer, and wherein the toy apparatus comprises:
  i) a device having a plurality of separate images;
  ii) the separate images are displayed on panels;
  iii) the panels are rotatable;
  iv) the panels are such that when they are rotating and when the separate images are viewed by the viewer, they provide an optical illusion due to the viewer's persistence of vision; and
  v) the toy apparatus is movable from place to place The toy apparatus of the present invention is advantageous in that it is able to be constructed without the viewing apertures as deployed in GB2511117. This enables the toy apparatus of the present invention to provide more flexibility in manufacturing and easier observance by the viewer.

The toy apparatus may be one in which the toy apparatus is an optical toy apparatus. The optical toy apparatus may be one which provides animation or blended imagery due to the viewer's persistence of vision.

The optical toy apparatus may be in the form of, for example, a praxinoscope, a thaumatrope, a flip/flicker book, a pedemascope, a slipping slide, a mutoscope, a giphoscope, or another optical illusion toy apparatus without the need for viewing apertures to facilitate the optical illusion. Other optical toy apparatus may be provided by the present invention.

The toy apparatus may be constructed for manual movement by the viewer. In this case, the toy apparatus may be moved by hand or the toy apparatus may include a handle and a shaft for pushing the toy apparatus in order to cause the toy apparatus to move. In this case the handle and shaft may impart force directly onto the the toy apparatus for presenting the optical illusion to the viewer. In other embodiments, the handle and shaft may be omitted but the toy apparatus may still be pushed by the viewer, for instance with a stick.

Alternatively, the toy apparatus may include means to receive force indirectly and through other parts of the toy apparatus; for example, the axle of wheels on a surface engage and deploy a pulley system to the axle of the device. In other embodiments, the toy apparatus may include means to affect the rotation speed of the device, for example, gear wheels.

Alternatively, the toy apparatus may include a propulsion or power source for causing the toy apparatus to move. The propulsion or power source may be a battery, solar, wind or electric or other means. Other propulsion or power sources may be employed such for example as a wind-up spring, wind-up spring motor or a flywheel.

The toy apparatus may be constructed for movement along a surface, or for movement through air, or for movement through a liquid, for example water. The toy apparatus may include other means to propel it through air or liquid.

The toy apparatus may have the device integrated subtly into the model's design to enrich role-play for the viewer and promote attraction to the toy apparatus.

The toy apparatus may be one in which the panels have one or both sides of each panel displaying separate images.

The toy apparatus may be one in which the panels are flexible or rigid and may be of any suitable shape.

In one embodiment, the panels are on a reel device.

The toy apparatus may be one in which the device comprises includes a flip, roll or hinge mechanism, which would allow for different constructions of toy apparatus and ease of visual registration.

The toy apparatus may be one comprises a slowing means to hold back the ensuing panels to give the viewer time to register the present panel and its image, before it in turn is supplanted by the following panel. The present panel may be held in position by a frame, stopper, or other means so that it may be kept static to allow for clear registration by the viewer. This toy apparatus is similar to a mutoscope. Other constructions for the toy apparatus may be employed. The toy apparatus may be one in which the slowing means moves against the panels, or the panels move against the slowing means.

The toy apparatus may be one that comprises an axle, so that the panels and their separate images rotate about the axle. Alternatively, the toy apparatus may be one where the panels and their separate images are mounted such that they rotate about an axis and not about an axle.

The toy apparatus may be one in which the toy apparatus comprises a housing having panels to display the separate images, and in which panels and their separate images are situated on top or inside the housing The toy apparatus may be one where the panels and their separate images may be mounted on the outside or inside of the housing. In this embodiment the intermediate parts that separate the panels may lie flat or may be raised.

The toy apparatus may be one which includes a connection means to cause rotation of the toy apparatus indirectly, for example to connect the device to wheels. The connection means may be, for example, a pulley system. Alternatively, the toy apparatus may be one in which the connection means affects the rotation speed of the device. The connection means may be, for example, gear wheels.

The toy apparatus may be one in which the toy apparatus includes a lock, decommissioning means or a disengagement means so that the toy apparatus may be operated separately from the wheels when preferred or that the toy apparatus may be decommissioned altogether.

The toy apparatus may be one in which the toy apparatus includes more than one device per toy apparatus.

The toy apparatus may be one in which the housing may be constructed for rolling, or for protection of the panels and their separate images. The housing may be a ball, a cylinder or other means that allows for rotation. Other constructions for the housing may be employed.

The toy apparatus may be constructed as a stand-alone toy. In this case, the toy apparatus may be a single function toy.

Alternatively, the toy apparatus may be constructed such that it forms part of another toy or comprises a component part of a toy. In this case, the toy apparatus may be part of a multi-functional toy having other toy parts for providing other toy functions. Alternatively, the toy apparatus may be constructed such that it forms a component part of a toy. In this case, the toy apparatus may be, for example, constructed as at least one wheel for fitting to a toy. With four wheels, the toy may then be, for example, a toy pram. With three wheels, the toy may then be, for example, a tricycle.

The toy apparatus may include audio and/or lighting means.

BRIEF DESCRIPTION OF DRAWINGS

Embodiments of the invention will now be described solely by way of example and with reference to the accompanying drawings in which.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Referring to the Figures, where there are similar parts these have been given the same reference numerals for ease of comparison and understanding.

Figure 1:
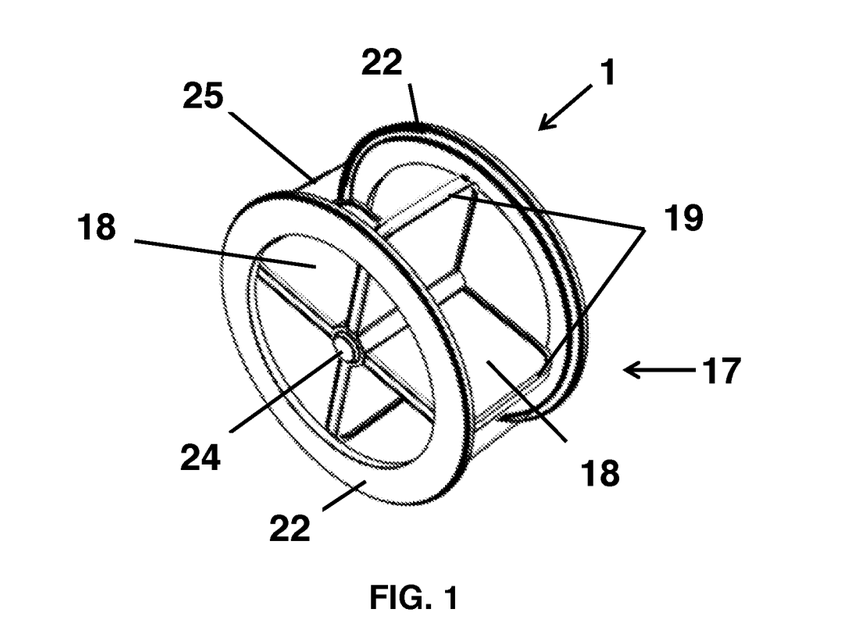
FIG. 1 is a perspective view of first toy apparatus of the present invention.
Figure 2:
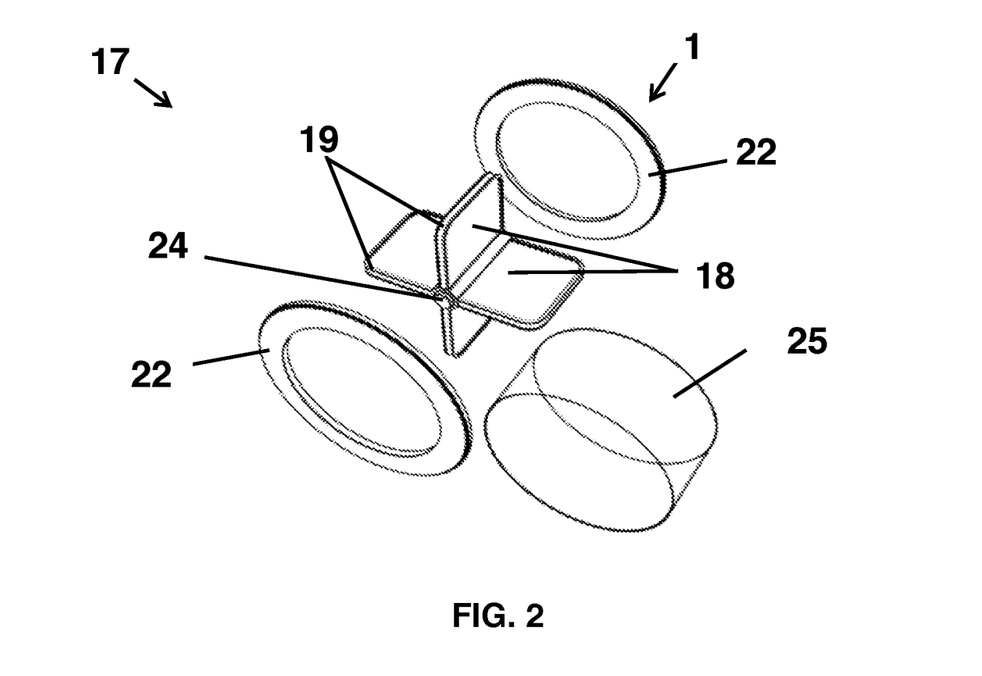
FIG. 2 is an exploded view of the toy apparatus as shown in FIG. 1.

FIGS. 1 and 2, show a toy apparatus 1 which is constructed to travel from place to place and which provides an optical illusion for a viewer. The toy apparatus 1 comprises a device 17 having a plurality of separate panels 19 for displaying separate images 18 (not shown). The panels 19 and their separate images 18 are movable. The separate images 18 are such that when they are moving and when they are viewed by the viewer, they provide an optical illusion due to the viewer's persistence of vision.

The toy apparatus 1 is free from viewing apertures, such as in a zoetrope construction, which are looked through in order to see the panels 19 and their separate images 18 moving to provide the optical illusion. Because the toy apparatus 1 is free from the viewing apertures, the optical illusion is registered by the viewer more readily and the toy apparatus 1 is able to be produced more cheaply than comparable toy apparatus that requires viewing apertures and/or is able to allow for different materials to be used, for example wood.

As can be seen from a comparison of FIGS. 1 and 2, the toy apparatus 1 is constructed for manual movement from place to place by a viewer. The toy apparatus 1 rolls on rings 22 which act as wheels. In an alternative embodiment of the invention, four units of the toy apparatus may form the wheels of a larger toy, for example a pram (not shown).

The device 17 comprises four separate panels 19 which display the separate images 18 (not shown specifically and only shown by the reference number for ease of illustration). The separate images 18 display progressively developing images that, when the device 17 is in motion, give an optical illusion in the form of an animation to the viewer.

The device 17 comprises an axis 24. The panels 19 and their separate images 18 rotate about the axis 24 when the toy apparatus 1 rolls over a surface via the rings 22. The device 17 is enclosed in a housing 25. The housing 25 is transparent so that the panels 19 and their separate images 18 are able to be seen. The rings 22 attach to opposite sides of the housing 25.

Figure 3:
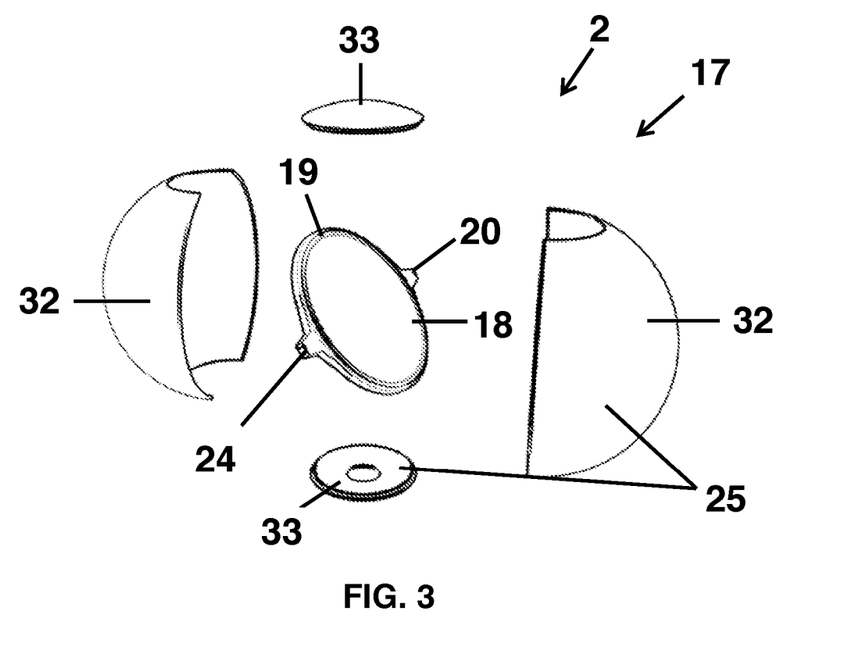
FIG. 3 is an exploded view of second toy apparatus of the present invention.

Referring now to FIG. 3, there is shown in exploded form toy apparatus 2 for providing an optical illusion for a viewer. The toy apparatus 2 is in the form of a ball. The toy apparatus 2 operates like the toy apparatus 1 in that both types of toy apparatus 1, 2 are able to be rolled along a surface. The toy apparatus 2 comprises two spherical halves 32, and end caps 33 which together comprise a housing 25. The toy apparatus 2 also comprises a panel 19 with two sides, and an axle 20 or axis 24 (it could be either). The toy apparatus 2 does not have the rings 22 of the toy apparatus 1.

Figure 4:
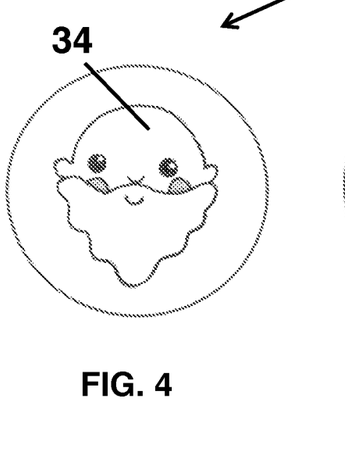
FIGS. 4 and 5 show the device of the toy apparatus of FIG. 3, with the device being in the form of a panel part having a face on one side and a hat on the other side.
Figure 5:
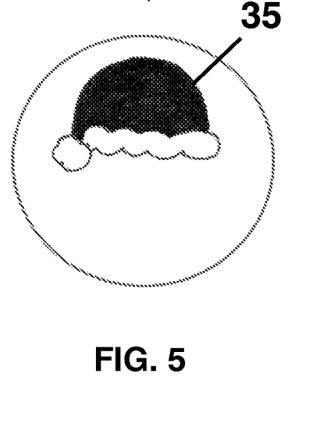
Figure 6:
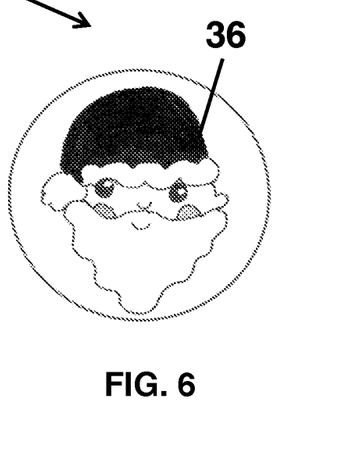
FIG. 6 shows how the face on FIG. 4 and the hat on FIG. 5 are able to blend together to show the face and the hat together via motion and the viewer's persistence of vision as in a thaumatrope.

In FIG. 3, the toy apparatus 2 has a device 17 which comprises one panel 19 having two sides. Each of the two sides of the panel 19 has a separate image 18. The panel 19 is shown in isolation in FIGS. 4 and 5. FIG. 4 shows an example of a separate image 18 and it will be seen that the actual image 34 is in the form of a man with a beard. FIG. 5 shows an example of a separate image 18 on the other side of the panel 19, and it will be seen that the actual image 35 is in the form of a hat. When the toy apparatus 2 is moved or the panel 19 of the device 17 is spun, the two separate images 34, 35 combine to give the image 36 shown in FIG. 6 which is an optical illusion. The image and optical illusion 36 shown in FIG. 6 is such that the man 34 is provided with the hat 35. This optical illusion is seen by the viewer due to the viewer's persistence of vision. The toy apparatus 2 is a form of a thaumatrope. Other types of imagery may be used, the bearded man with a hat being shown simply as an example.

Figure 7:
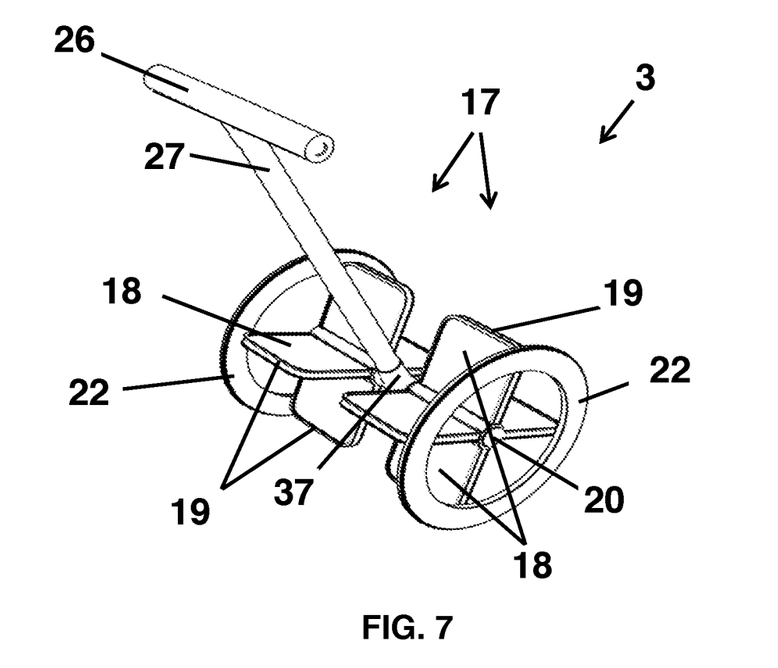
FIG. 7 is a perspective view of third toy apparatus of the present invention.
Figure 8:
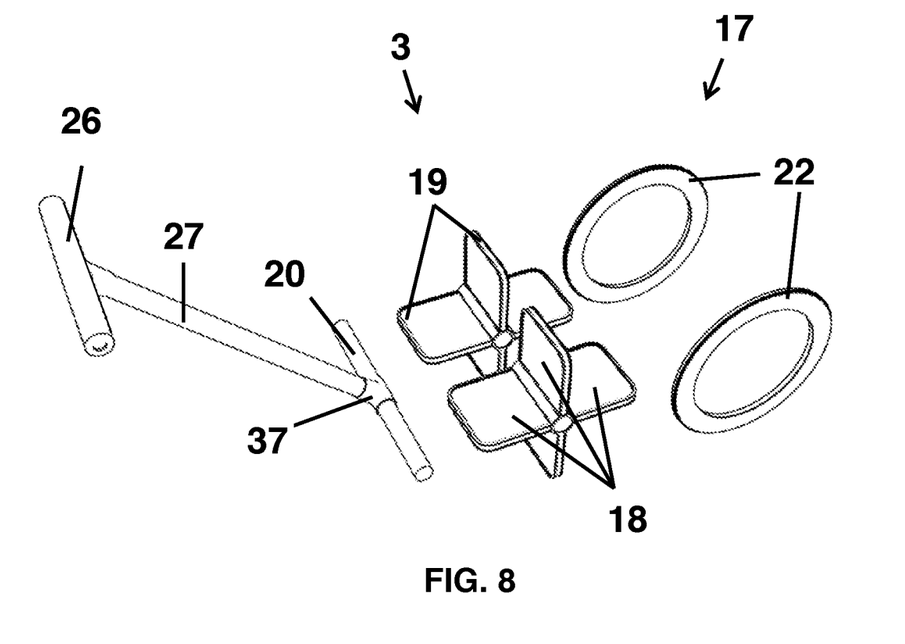
FIG. 8 is an exploded view of the toy apparatus shown in FIG. 7.

FIGS. 7 and 8 show toy apparatus 3 of the present invention. The toy apparatus 3 contains two devices 17 comprising two sets of panels 19, for displaying separate images 18 (not shown). Each side of each of the panels 19 may display an image 18 (not shown). The toy apparatus 3 comprises an axle 20 mounted between rings 22 which act as wheels. The two devices 17 are mounted on a frame 37. The frame 37 comprises a shaft 27 and a handle 26. The shaft 27 and the handle 26 enable the toy apparatus 3 to be pushed along a surface. When the toy apparatus 3 is pushed along a surface on the rings 22, the separate images 18 on the panels 19 of each device 17 provide the optical illusion. The optical illusion is seen by the viewer due to the viewer's persistence of vision.

Figure 9:
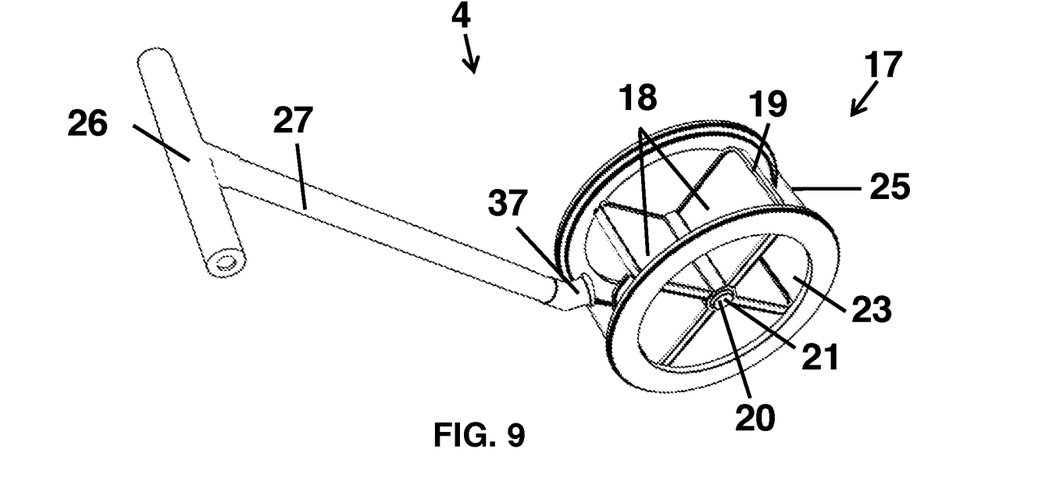
FIG. 9 is a perspective view of fourth toy apparatus of the present invention.
Figure 10:
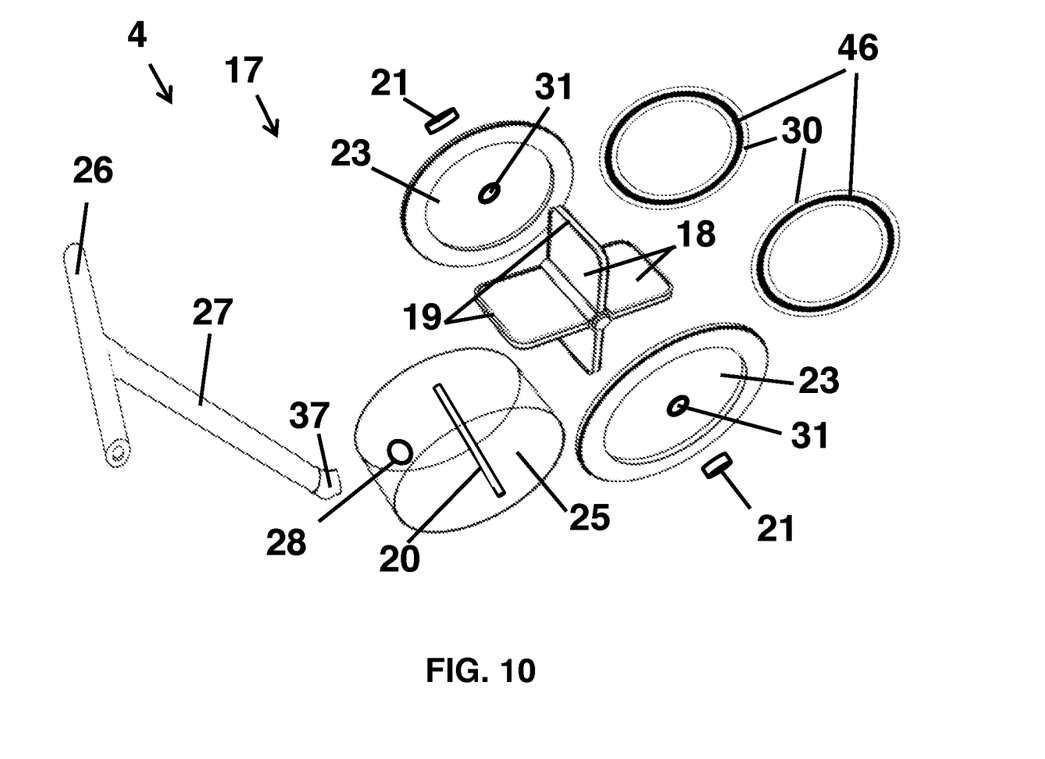
FIG. 10 an exploded view of the toy apparatus shown in FIG. 9.

FIGS. 9 and 10 show toy apparatus 4 having a single device 17 containing a set of panels 19. Each panel 19 may display a separate image 18 (not shown) on each of its sides, or alternatively if desired just on one of its sides. The device 17 rotates about an axle 20 via discs 23. The axle 20 passes via the device 17 through the disc apertures 31 to the discs 23 and is secured by axle nuts 21. The housing 25 secures to the inner rings 30.

FIG. 10 shows inner rings 30 which may have a channel, and ball bearings 46 or similar means which allow the discs 23 to freely rotate the device 17 with its panels 19 and its separate images 18 inside the housing 25. The housing 25 is transparent so that the separate images 18 on the panels 19 of the device 17 can be seen. The housing 25 has an aperture 28 to receive the frame 37. The toy apparatus 4 has a shaft 27 and a handle 26 for enabling the toy apparatus 4 to be pushed over a surface.

Figure 11:
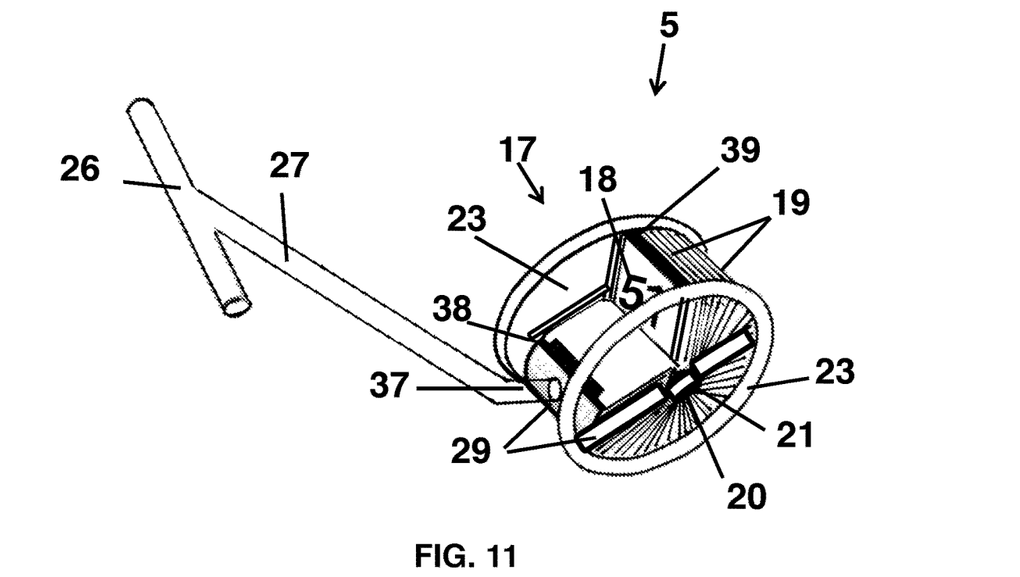
FIG. 11 is a perspective view of fifth toy apparatus of the present invention.
Figure 12:
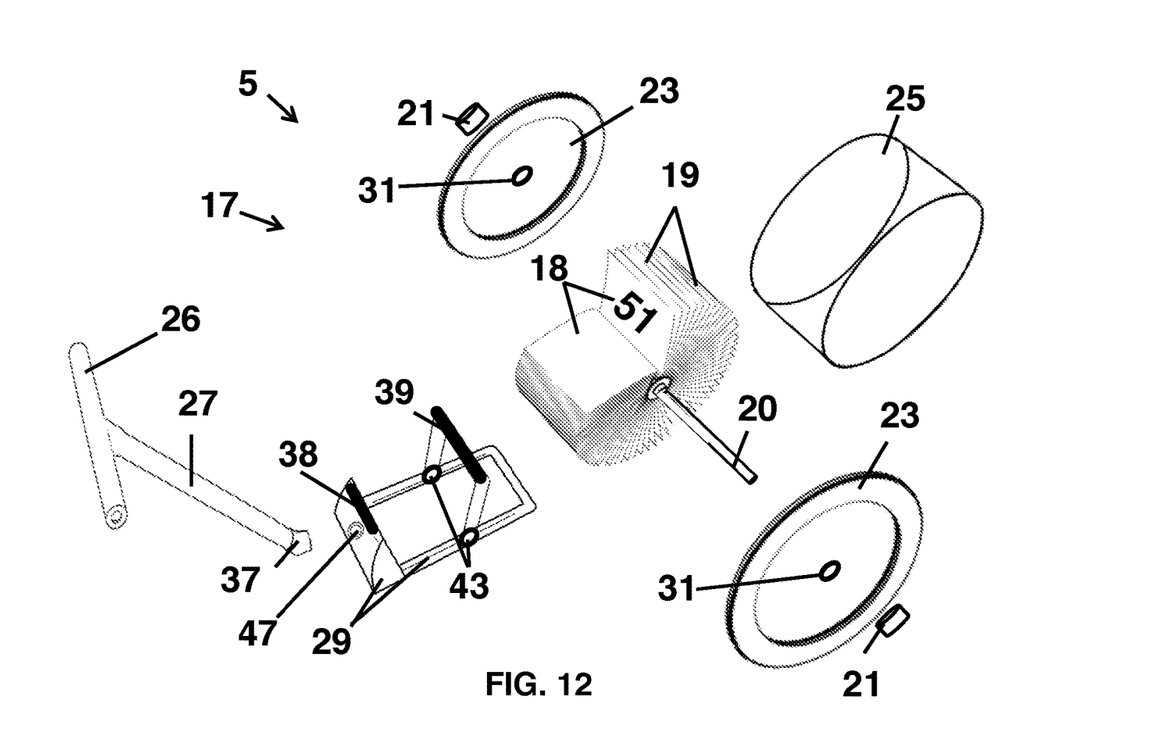
FIG. 12 is an exploded view of the toy apparatus shown in FIG. 11.

FIGS. 11 and 12 show toy apparatus 5. In the toy apparatus 5, the frame 37 locates to a frame part 29 via frame aperture 47. The frame 37 has a shaft 27 has a handle 26. The wheels in the toy apparatus 5 are in the form of discs 23 having apertures 31 for receiving opposite ends of the axle 20 and axle nuts 21 for fixing the axle 20 into place.

The axle 20 mounts a device 17. The device 17 has a plurality of panels 19 in the form of flexible leaves. Each panel 19 has a separate image 18 represented in FIGS. 11 and 12 by the number 51. The separate image 18 may be on one or both sides of each panel 19. The toy apparatus 5 is like a rolling mutoscope which is essentially a mechanical flicker book. The panels 19 of the device 17 are protected in the housing 25. The device 17 is mounted in frame 29 via an axle 20. Slowing means 38 sits in the frame part 29 in order to slow and separate the ensuing panels 19 of the device 17 to give the viewer time to register the separate image 18 on the present panel 19. The frame part 29 also comprises steadying and holding means 39 to aid the positioning and steadying of the separate image 18 on the present panel 19 for optimum visual registration.

FIG. 12 shows how the device 17 is mounted on the axle 20 and how the axle 20 sits in the frame part 29 via frame part apertures 43. The axle 20 extends through disc apertures 31 to discs 23 and the axle nuts 21.

Figure 13:
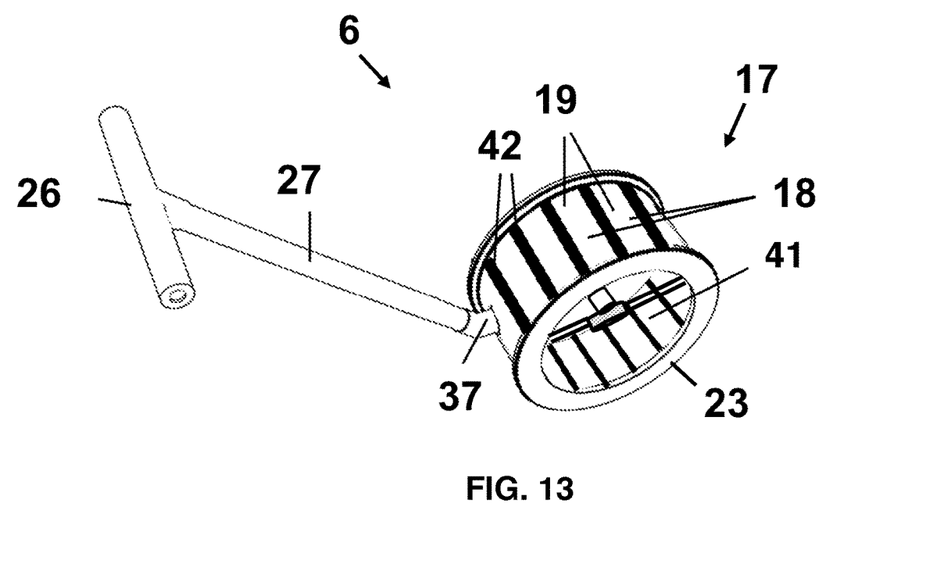
FIG. 13 shows sixth toy apparatus of the present invention.
Figure 14:
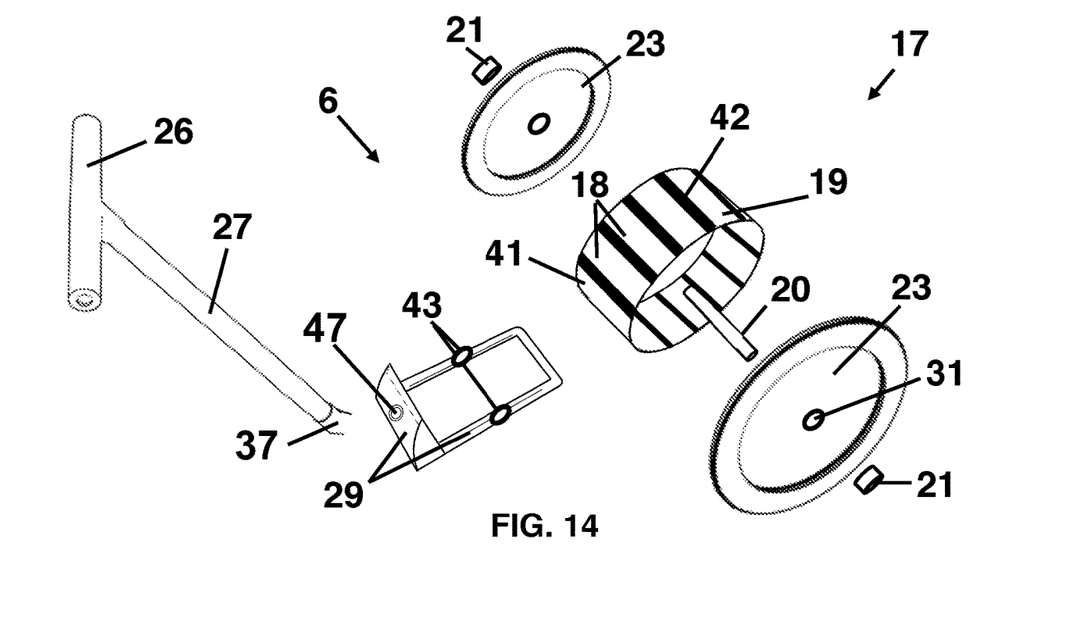
FIG. 14 is an exploded view of the toy apparatus shown in FIG. 13.

FIGS. 13 and 14 show toy apparatus 6.

FIG. 14 more clearly shows parts of the toy apparatus 6. The toy apparatus 6 has a frame part 37 which locates to a frame part 29 via a frame part aperture 47. The frame 37 has a shaft 27 has a handle 26. The discs 23 act as wheels. The device 17 is a cylinder 41 on which the panels 19 display the separate images 18 (not shown). The intermediate parts 42 exist to break up the separate images 18 on the panels 19 in order to provide the optical illusion when moved. In the toy apparatus 6, there is an axle 20. The device 17 which is the cylinder 41 sits inside frame part 29. The discs 23 which act as wheels fix to the device 17. The axle 20 extends through frame apertures 43 in the frame part 29 through disc apertures 31 and is held in place with axle nuts 21.

Figure 15:
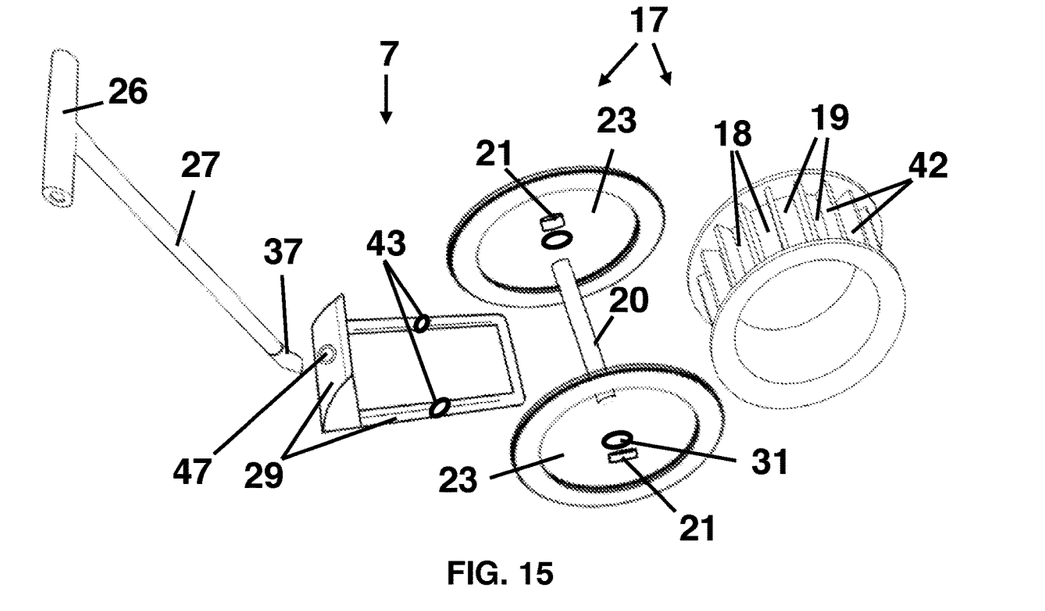
FIG. 15 shows seventh toy apparatus of the present invention shown exploded.
Figure 16:
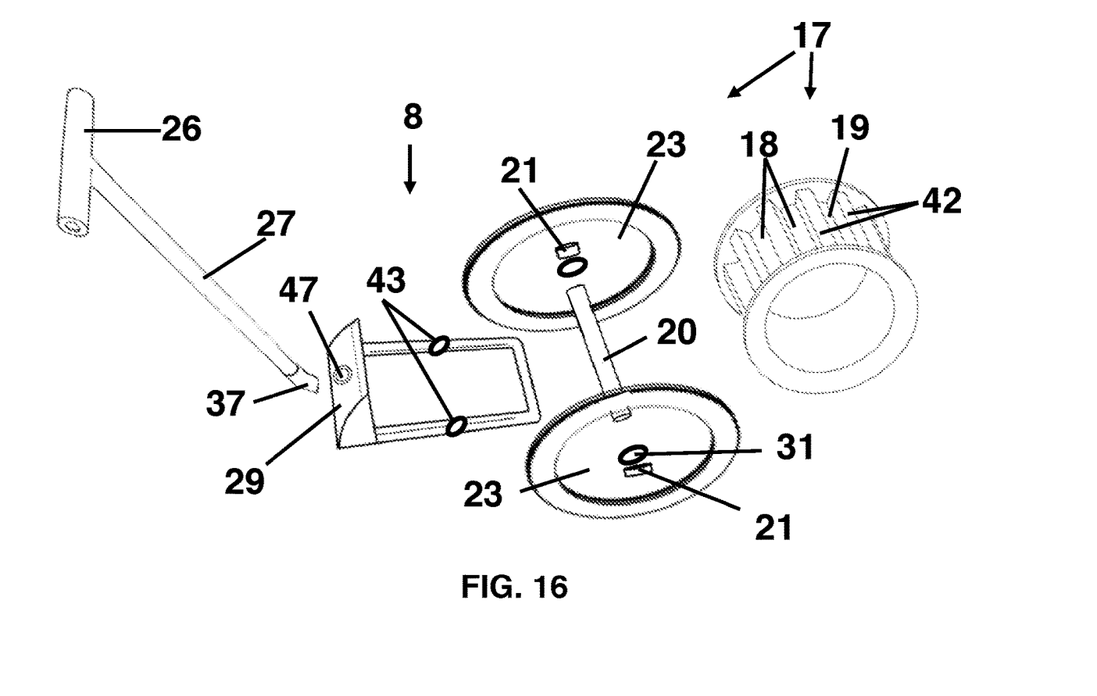
FIG. 16 shows eighth toy apparatus of the present invention shown exploded.

FIGS. 15 and 16 show exploded views of toy apparatus 7 and 8. The toy apparatus 7 and 8 are constructed in the same way as the toy apparatus 6 in FIGS. 13 and 14, and only the device 17 formation is different. The device 17 in the toy apparatus 7 and 8 has raised intermediate parts 42 instead of these being flat. The raised intermediate parts 42 sit between the panels 19 displaying the separate images 18 and serve to break up the panels 18 and their separate images 18 in order to provide the optical illusion to the viewer when moved. These intermediate parts 42 may be of a dark colour (not shown) if preferred.

Figure 17:
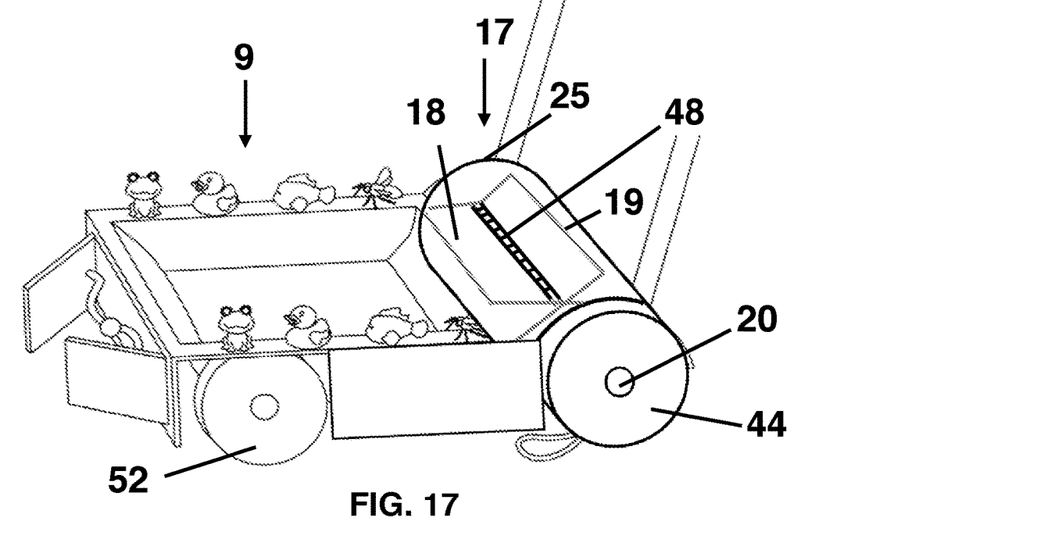
FIG. 17 shows nineth toy apparatus of the present invention.

FIG. 17 shows toy apparatus 9 and is a toy walker. The device 17 sits in between back wheels 44. The panels 19 display the separate images 18 of the device 17. The device 17 is turned by an axle 20 that is the same axle 20 as for the wheels 44. The back wheels 44 turn the device 17 when the toy apparatus 9 is pushed along a surface.

FIG. 17 also shows the device 17 having a flip, roll or hinge mechanism 48 residing in the centre of the panels 19. Therefore the panels 19 are in two halves. The housing 25 protects the device 17. The device 17 might be situated in between front wheels 52 of the toy walker if preferred. Alternatively, in another embodiment not shown, the device 17 may have its own wheels if preferred.

FIG. 17 shows that the panels 19 of the toy apparatus 9 may be rigid or flexible. It also shows the inclusion of other toy features typical for the age group of the viewer.

Figure 18:
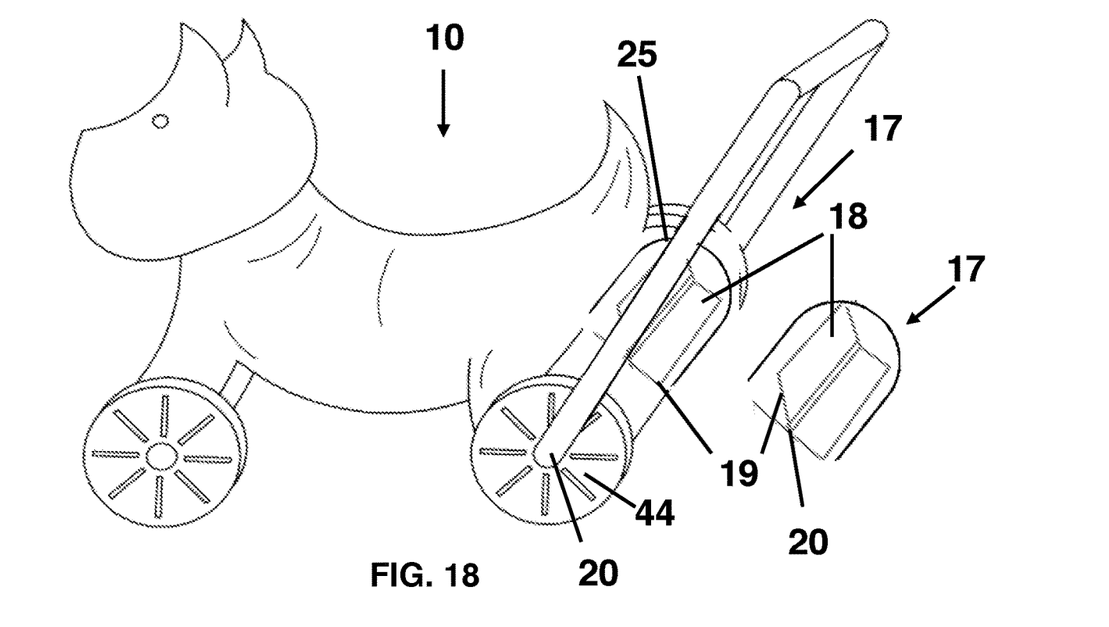
FIG. 18 shows tenth toy apparatus of the present invention.

FIG. 18 shows toy apparatus 10 and is a different toy walker. The device 17 sits in between the back wheels 44 of the toy walker. The panels 19 with the separate images 18 displayed on them are turned by the axle 20 that is the axle 20 for the wheels 44. As in FIG. 17, the back wheels 44 turn the device 17 when the toy walker is pushed along a surface. The housing 25 protects the device 17. The device 17 has rigid panels that rotate about the axle 20.

Figure 19:
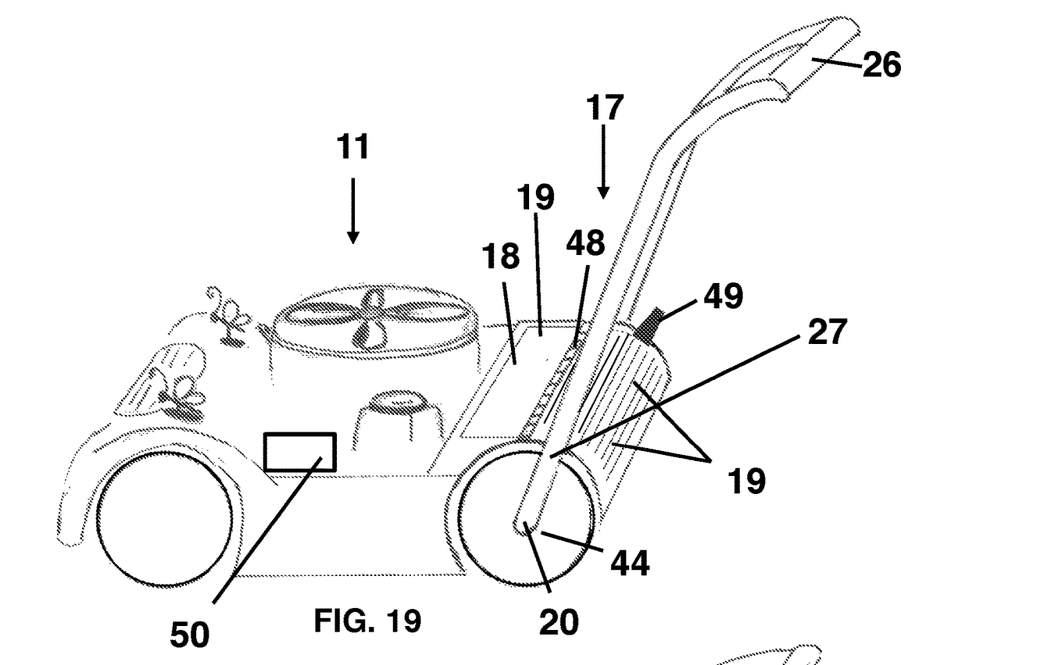
FIG. 19 shows eleventh toy apparatus of the present invention.

FIG. 19 shows toy apparatus 11 which is another toy push-along in the style of a toy lawnmower. The toy apparatus 11 shows the device 17 having a flip, roll or hinge mechanism 48 at the top of the panel 19 which displays the separate image 18. The panels 19 are turned by axle 20, which sits under the shaft 27, connected to the wheels 44 and the panels 19 are laid down flat one panel 19 at a time for the viewer to register. The rest of the panels 19 are stacked up ready to be lifted and laid down by the flip, roll or hinge mechanism 48. The toy apparatus 11 also comprises a lock, decommissioning means and disengagement means 49. The lock, decommissioning means and disengagement means 49 will allow the device 17 to be disengaged from the axle 20 to stop turning with the wheels 44 for manual operation or decommission or to lock the device 17 in a certain position.

The toy apparatus 11 may include a propulsion/power source 50 if preferred.

Figure 20:
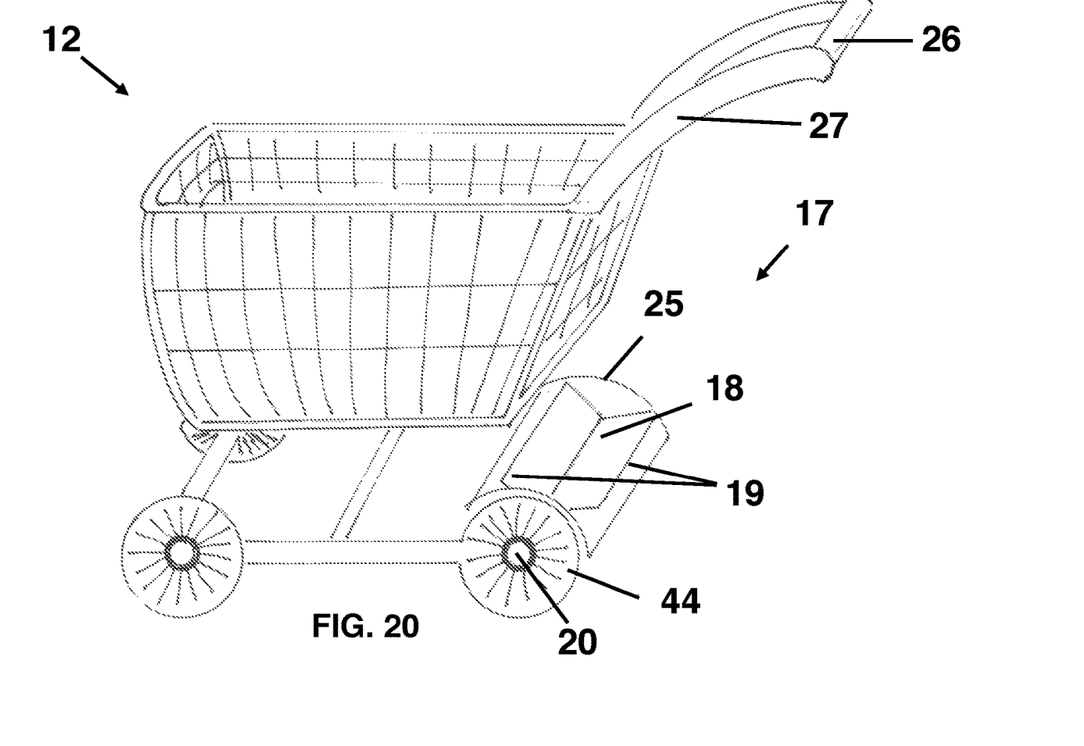
FIG. 20 shows twelfth toy apparatus of the present invention.

FIG. 20 shows toy apparatus 12 which is a toy in the form of a shopping trolley. This toy apparatus 12 operates in the same way as FIGS. 7, 8, 9, 10 and is given by way of further example and commercial appeal. The device 17 sits between the back wheels 44

Figure 21:
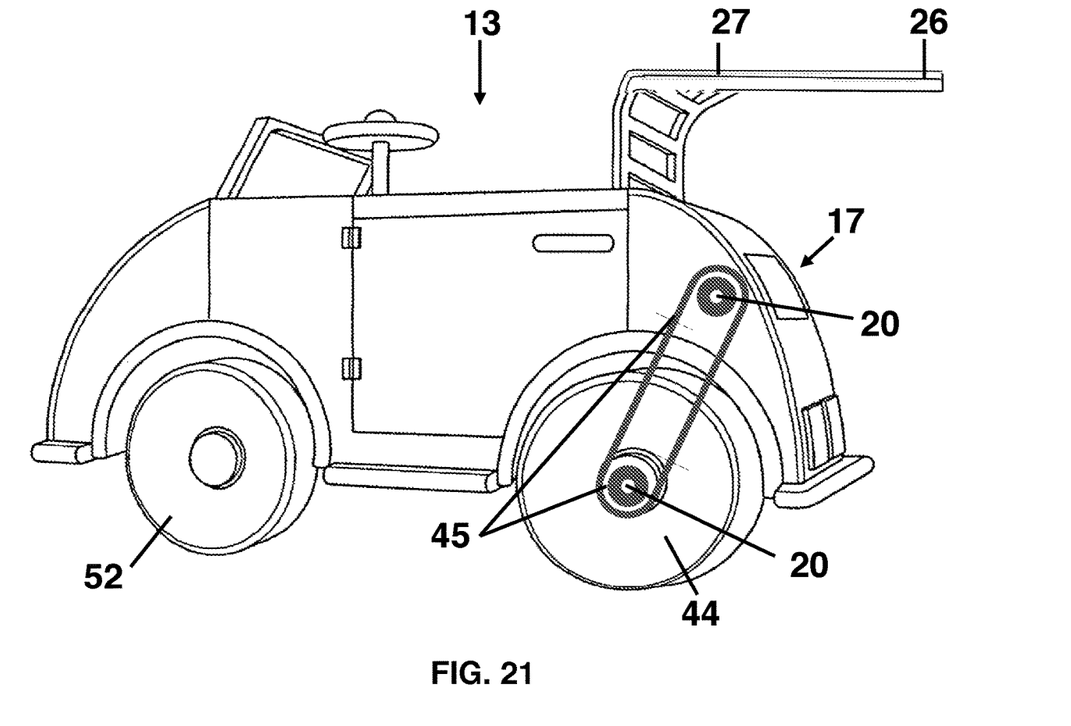
FIG. 21 shows thirteenth toy apparatus of the present invention.

FIG. 21 shows toy apparatus 13 in the form of a toy walker designed as a toy car for commercial appeal. The toy apparatus 13 has an axle 20 on the device 17 (not shown) indicated as residing in the car registration plate area. The axle 20 of the device 17 is attached to back wheels 44 by means of a pulley system 45. The toy apparatus 13 has a handle 26 and shaft 27 for moving the toy apparatus 13. When the toy apparatus 13 is moved the device 17 will rotate due to the pulley system 45 attached to the axle 20 of wheels 44. When the device 17 with its separate images 18 on the panels 19 are rotated they provide an optical illusion to the viewer due to the viewer's persistence of vision.

FIG. 21 shows the pulley system 45 is attached to the back wheels 44 but it may be attached to the front wheels 52 of the toy walker. This embodiment is given by way of example.

Other means may be used for remote force such as a detachable shaft or stick (not shown)

As indicated above, all the different types of toy apparatus 1-13 operate such that when the panels 19 with their separate images 18 are moving and viewed by a viewer provide an optical illusion due to the viewer's persistence of vision. The panels 19 and their separate images 18 are movable such as to provide the optical illusion when the toy apparatus 1-13 is being moved. The toy apparatus 1-13 is constructed for movement from one place to another in order to cause the panels 19 and their separate images 18 on the toy apparatus 1-13 to move and provide the optical illusion. The toy apparatus 1-13 is free from viewing apertures which are of a type which are looked through in order to see the panels 19 and their separate images 18 moving to provide an optical illusion due to a viewer's persistence of vision. Thus, the toy apparatus 1-13 is able to be produced more cheaply than comparable toy apparatus having the viewing apertures in order to work and/or the production may allow for other materials to be used such as wood which may be better for the environment and for ease of visual registration.

The toy apparatus 3-13 is such that the panels 19 and their separate images 18 are rotated about axles 20. The toy apparatus 1 is such that the panels 19 and their separate images 18 rotate in a cylinder 41. The toy apparatus 2 is such that the panel 19 and its separate images 18 rotate in a sphere 32,33. The toy apparatus 1, 2, 6, 7 and 8 may be such that the panels 19 and their separate images 18 may rotate about an axle 20 or simply an axis 24. In the toy apparatus 2, the spherical halves 32 and the end caps 33 form a housing 25, with the separate images 18 on the panel 19 being inside the housing 25.

It is to be appreciated that the embodiments of the invention described above with reference to the accompanying drawings have been given by way of example only and that modifications may be affected. The specification shows stand-alone toy apparatus and also examples of multi-functional toys having other toy parts for providing other toy functions.

If desired, the toy apparatus may form part of another toy, in which case the toy apparatus of the present invention may be in the form of a multi-functional toy having other toy parts for providing other toy functions. Other types of wheels, other types of frames, and other types of constructions to those shown may be employed. Other types of images may also be employed. Individual components shown in the drawings are not limited to use in their drawings and they may be used in other drawings and in all aspects of the invention. The invention also extends to the individual components mentioned and/or shown above, taken singly or in any combination.

What is claimed is:

1. Toy apparatus which is constructed to travel from place to place and which provides an optical illusion for a viewer, and wherein the toy apparatus comprises:
   i) at least one wheel configured to be rotatable around a first axis by friction between the at least one wheel and a surface as the at least one wheel moves along the surface;
   ii) a plurality of panels extending radially from a second axis and displaying respective separate images;
   wherein the plurality of panels is directly or indirectly linked to the at least one wheel to rotate around the second axis of the at least one wheel due to a rotation of the at least one wheel around the first axis, such that when they are rotating and when the separate images are viewed by the viewer, the separate images provide an optical illusion due to the viewer's persistence of vision; and
   wherein the first axis and the second axis are different axes or form a single axis; and wherein the toy apparatus is free from viewing apertures.

2. Toy apparatus according to claim 1 in which the toy apparatus is constructed for manual movement by the viewer.

3. Toy apparatus according to claim 1 in which the toy apparatus includes a propulsion or power source for causing the toy apparatus to move.

4. Toy apparatus according to claim 1 in which each of the panels of the plurality of panels has a first surface and a second surface, and has one or both of the first surface and the second surface displaying separate images.

5. Toy apparatus according to claim 1 in which the panels are flexible or rigid.

6. Toy apparatus according to claim 1 in which the toy apparatus includes a flip, roll or hinge mechanism.

7. Toy apparatus according to claim 1 in which the toy apparatus comprises a slowing means and a frame or stopper, in order for the panels to be properly registered by the viewer.

8. Toy apparatus according to claim 1 in which the toy apparatus includes a connection or geared means to cause rotation of the at least one wheel or to affect the rotation speed of the plurality of panels.

9. Toy apparatus according to claim 1 and which includes a lock, decommissioning or disengagement means.

10. Toy apparatus according to claim 1, comprising a plurality of sets of panels.

11. Toy apparatus according to claim 1, comprising a transparent housing.

12. Toy apparatus according to claim 1 in which the toy apparatus is constructed to form part of another toy or comprises a component part of a toy.

13. Toy apparatus according to claim 1 and including audio and/or lighting means.

14. Toy apparatus according to claim 1, wherein the plurality of panels has sides fixedly joined to the at least one wheel directly.

15. Toy apparatus according to claim 1, wherein the first axis and the second axis are a single axis, the toy apparatus comprising an axle extending along the single axis, wherein the plurality of panels are fixedly joined to the axle, and the axle is fixedly joined to the at least one wheel to rotate with the at least one wheel around the single axis, such that the axle provides an indirect connection between at least one wheel and the plurality of panels, causing the plurality of panels and the at least one wheel to rotate together.

16. Toy apparatus according to claim 1, wherein the first axis and the second axis are a single axis, the toy apparatus comprising an axle extending along the single axis, wherein:
the plurality of panels is rotatably joined to the axle and fixedly joined to the at least one wheel; and
the at least one wheel is rotatable with respect to the axle;
rotation of the at least one wheel causes rotation of the plurality of panels about the axle.

17. Toy apparatus according to claim 1, wherein the first axis and the second axis are a single axis and the at least one wheel comprises two wheels disposed along the single axis to sandwich the panels therebetween.

18. Toy apparatus according to claim 1, wherein the at least one wheel is a ring or a disc.

19. Toy apparatus which is constructed to travel from place to place and which provides an optical illusion for a viewer, and wherein the toy apparatus comprises:
i) at least one wheel configured to be rotatable around a first axis by friction between the at least one wheel and a surface as the at least one wheel moves along the surface;
ii) a panel having two surfaces and extending radially from both sides of a second axis of the at least one wheel, each surface displaying a respective separate image;
wherein the panel is directly or indirectly linked to the at least one wheel to rotate around the second axis due to a rotation of the at least one wheel around the first axis, such that when the separate images are viewed by the viewer, the separate images provide an optical illusion due to the viewer's persistence of vision;
wherein the first axis and the second axis are different axes or form a single axis; and
wherein the toy apparatus is free from viewing apertures.

* * * * *